July 28, 1953

L. E. VAN HISE 2,646,809

DISHRACK

Filed July 25, 1950

INVENTOR.
Lester E. Van Hise
BY
Attorney

July 28, 1953 L. E. VAN HISE 2,646,809
DISHRACK
Filed July 25, 1950 3 Sheets-Sheet 2
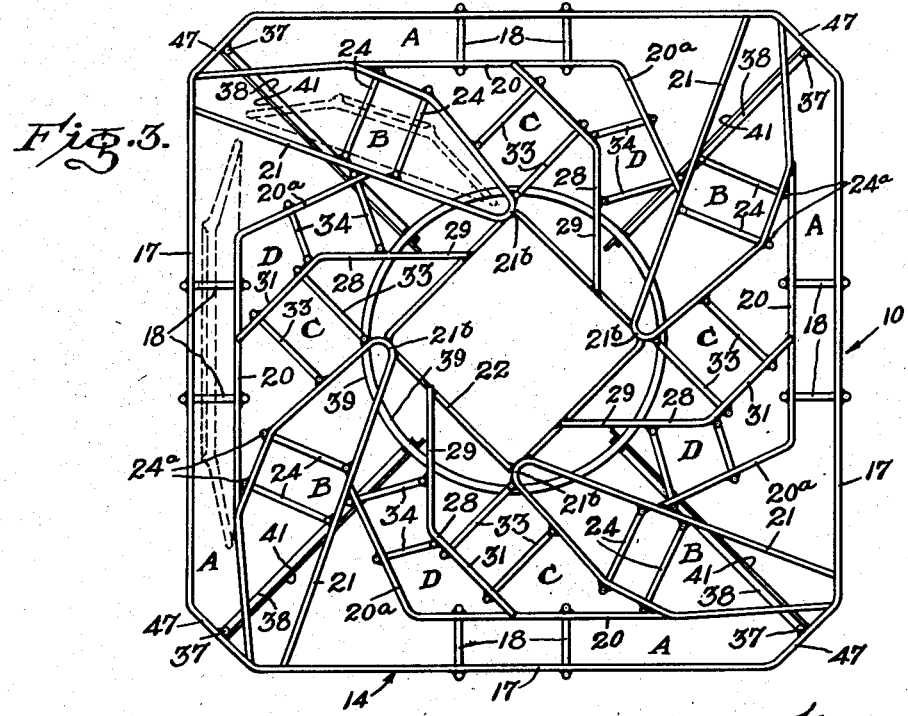
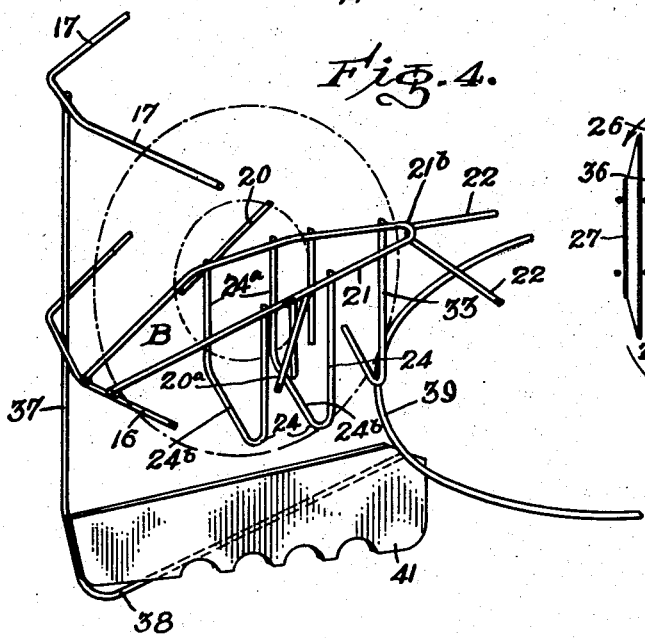
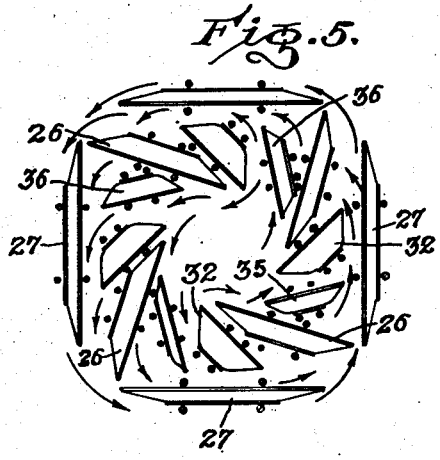
INVENTOR.
Lester E Van Hise
BY
Attorney.

July 28, 1953 L. E. VAN HISE 2,646,809
DISHRACK
Filed July 25, 1950 3 Sheets-Sheet 3
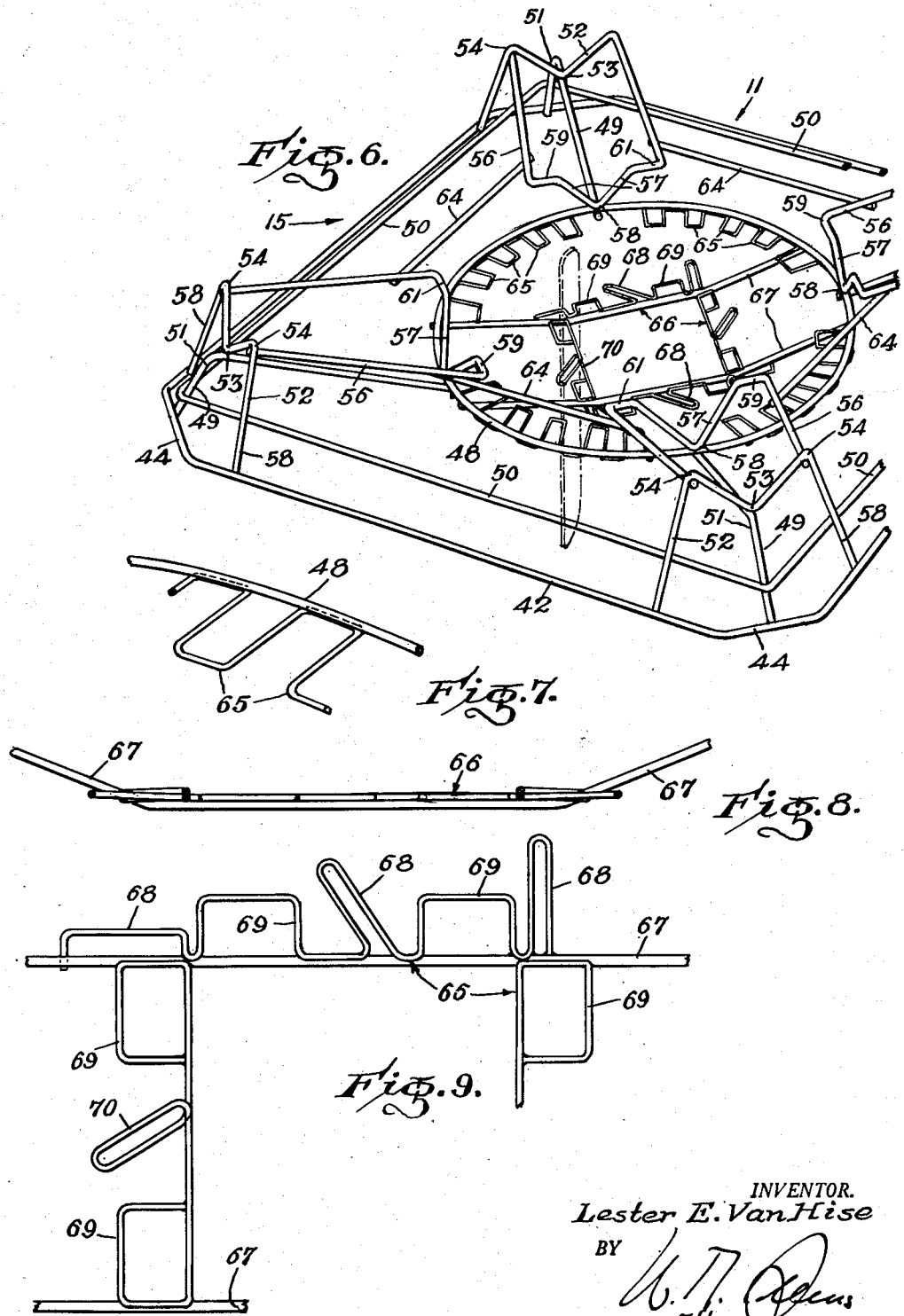
INVENTOR.
Lester E. Van Hise
BY
Attorney.

Patented July 28, 1953

2,646,809

UNITED STATES PATENT OFFICE 2,646,809

DISHRACK

Lester E. Van Hise, Los Angeles, Calif.

Application July 25, 1950, Serial No. 175,774

5 Claims. (Cl. 134—182)

The present invention relates to mechanical dishwashers and is particularly concerned with wire racks into which dishes and tableware are loaded to be placed in the casing of the dishwasher as to expose their surfaces to the cleansing water.

Since the dishes and tableware used for serving and eating food vary greatly in size, shape and number, the problem of positioning them in the casing of the washer so that all surfaces of each article are exposed to the cleansing action of the water being circulated in the housing is one requiring careful consideration.

The dishwasher rack of my invention may be used in a dishwasher including a casing having a cover on which an electric motor is mounted, rotary means driven by said motor being positioned at the bottom of the casing and effective to project cleansing water outwardly and against the dishes and tableware supported by the rack.

A dishwashing machine of the kind to which the dishrack of my invention is particularly adapted is disclosed in my co-pending patent application Serial No. 64,295, filed December 9, 1948, but it is to be understood that the dishrack of this invention is not restricted to use with the dishwasher there disclosed since it may be used with any dishwasher in which water is thrown outwardly with force from the axis of the machine.

It is an object of my invention to provide a dishrack comprising a lower part which may be readily loaded while in position in the dishwasher casing, and an upper part which may be positioned over the loaded lower part and glasses and tableware supported thereon, after which the dishwasher cover may be placed in position and the machine put into operation, and from which the dishes may be equally easily removed from the rack after washing.

A further object of my invention is to provide a rack for dishwashers of the kind referred to which is simple for the housewife to manipulate and which has no loose parts requiring adjustment and which might be mislaid.

Another object of my invention is to provide a dishrack arranged to provide a plurality of similarly arranged compartments so that in arranging the used dishes the housewife can quickly determine the most convenient arrangement of dishes in one series and duplicate it in the other series of the compartments.

A still further object of my invention is to arrange the compartments of the dishwasher to the best advantage so that the water thrown outwardly by the water-circulating means of the dishwasher will be deflected from one dish to another to flow over all the dish surfaces and strike all of the tableware.

Still further objects and features of my invention will appear upon reading the following specification and claims and upon considering in connection therewith the attached drawings to which they relate.

Referring now to the drawings in which preferred embodiments of the present invention are illustrated:

Figure 3 is a plan view of a lower section of the device;

Figure 4 is a fragmentary detail, drawn on a larger scale, showing the arrangement of wire supporting members at a corner of the lower section;

Figure 5 is a schematic diagram showing how dishes are arranged in the device to secure full access of cleansing liquid to all dish surfaces;

Figure 6 is a perspective view of the upper part of the two-part rack with one corner broken away in order that the figure may be drawn on a larger scale than Figure 2;

Figure 7 is a fragmentary view in perspective showing the manner of securing a length of wire which forms a series of loops to a ring-shaped connecting member;

Figure 8 is a partial section on an enlarged scale through the center of the upper section of the rack; and Figure 9 is an enlarged fragmentary detail showing, in plan, the arrangement of lengths of loop-forming wire secured to a centrally located wire frame member shown in Figure 6.

Figure 1:
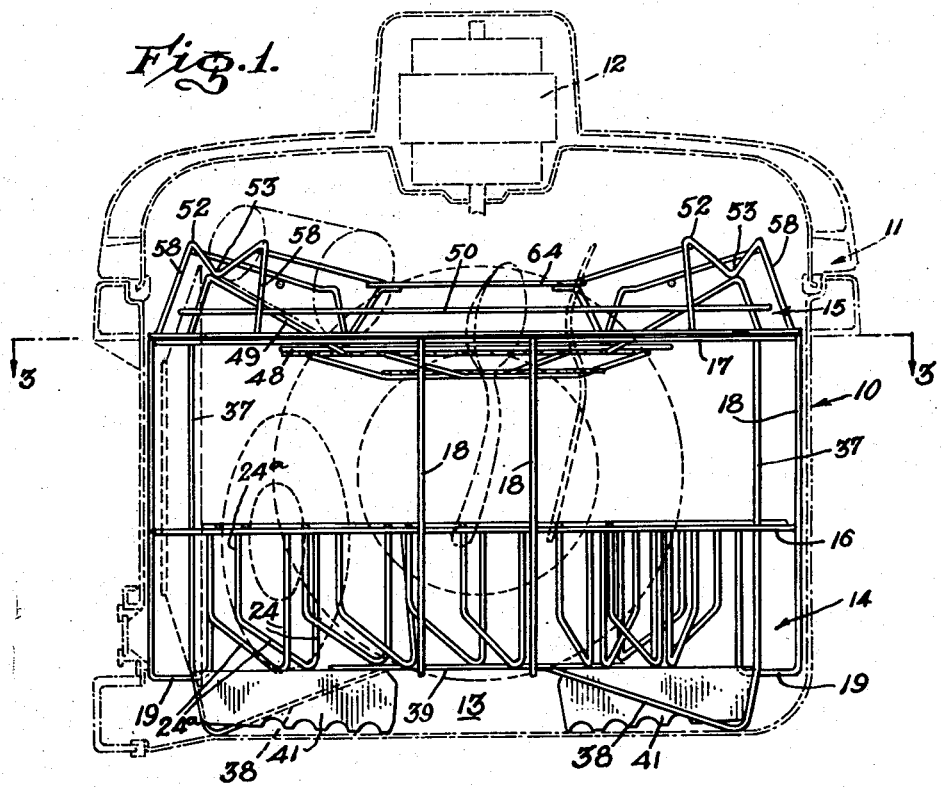
Figure 1 is a side elevation of the supporting and positioning device or rack in assembled relation in a dishwasher casing indicated in broken lines.

Referring now to Figure 1 of the drawings, the numeral 10 indicates the casing of a dishwashing machine fitted with a cover 11. On the cover an electric motor 12 is mounted which drives an unshown impeller located in the space 13 at the bottom of the housing. It is to be understood that the operating mechanism of the dishwasher is not a part of the present invention and the dishwasher may be considered merely as a conventional arrangement.

The dishwasher rack of my invention comprises a lower part 14 and an upper part 15 supported thereon, the whole rack being rectangular in plan view with the corners angled off. Referring now to the lower section in particular, it includes a central encircling horizontal frame member 16 made of heavy wire, as are all the parts of the rack. An upper encircling peripheral frame member 17, identical in configuration to member 16 and also lying in a horizontal plane, is held in spaced relation to that member by a plurality of vertical members 18 two of which are located centrally of each side. Vertical members 18 extend below central encircling horizontal member 16 and are there bent inwardly into U form, as shown at 19, the inward and upwardly extended arms of the U portion being connected in each instance to a member 20 spaced inwardly from, extended parallel to, and lying in the same plane as the adjacent side of member 16.

One end of each member 20 connects to member 16 while its opposite end angles inwardly, in its length 20a, and connects to a length of wire 21 which extends inwardly from member 16 adjacent a corner thereof, to a central frame member 22, as shown in Figure 3. Member 22 is formed as a square, although it need not necessarily be of that form, and lies in the horizontal plane of peripheral frame member 16 to provide an inner boundary element for the inner ends of a plurality of elements extending between it and member 16. The compartment defined by the members 20, 16, and 18 is indicated by the reference character A and such a compartment is present along each side of the lower rack section immediately inside the frame member 16.

The horizontal margins of a dish-supporting frame B are largely defined by a deformed wire 21 the ends of which connect to frame member 16 adjacent a corner. Member 21 is reversely bent at 21b to extend at an angle for a short distance, is then bent to extend parallel to its opposite side for a shorter distance until it connects to the end of member 20, and then angles toward its opposite end in substantial alignment with the straight portion of member 20 which it connects to peripheral frame member 17. The bottom of the dish-supporting frame B the marginal limits of which are defined by member 21 is provided by two identically formed downwardly extending members 24, generally of U shape but having one arm 24a (Figure 4) shorter than the other, the shorter arm being secured to the short central portion of member 21 while the upper ends of the longer arms are secured to the longer straight side of member 21, the arms being connected by a sloping bottom portion 24b. As is the case of frames A, there are four frames B, each one located with one of its ends adjacent the corner of the rectangular lower section and directed generally toward the center of that section and, more specifically, being fixed at its inner end to a corner of the central frame member 22.

Two series of frames have now been described. The frames A between members 16 and 20 are clearly seen in Figure 3 to extend nearly the full length of each side of the lower section of the rack and are adapted to receive and seat the largest plates used, as for instance the meat plates, indicated at 27 in Figure 5. The frames B formed by members 21 and 24 are shorter in length than frames A but are somewhat deeper from back to front and slope from the deepest portion toward each edge as to conform roughly to the shape of soup plates, illustrated at 26 in Figure 5, which they are intended to support. It will be noted that the sloped bottom portions 24b of members 24 are effective to hold the soup plates in upright position since the slope brings the wire against the slope of the outside of the soup plate toward its relatively small base.

Referring now to Figure 5 in which dishes are illustrated in the positions they are held by the lower rack section, it will be noted that while the largest plates, indicated at 27 and positioned as described in frames A, are held with their faces squarely toward the center of the dishwasher, soup plates 26, held as described by frames B, are positioned with their faces at an angle to a radial line from the center.

Another wire member 28 in the horizontal plane of members 16 and 20 is connected at its inner end to center frame member 22 and at its outer end to frame member 20. Member 28 is bent near its center to provide two angularly related lengths 29 and 31. It cooperates, as shown in Figure 5, with portions of wires 22, 21, and 20 upon its opposite sides to define the horizontal marginal limits of compartments or frames C and D adapted to support a deep dish such as a cereal bowl, indicated by the numeral 32 in Figure 5, of less diameter than a soup plate. Two U-shaped members 33, similar to aforedescribed members 24, provide the bottom support for compartment C.

The fourth compartment in each series is formed between member 28 and the inwardly bent end 20a of member 20. This compartment is also provided with U-shaped members 34 similar to U-shaped member 24, shorter arms of each member being connected to the inwardly bent end 20a while the longer arms connect to member 28. Compartment D is shaped to support smaller and shallower dishes than compartment C, for example a small plate of the type indicated by the reference character 36 in Figure 5.

The entire lower section of the rack is supported above the bottom of the dishwasher casing by vertical members 37 located at its corners where it is secured to the upper and central horizontal peripheral frame members 17 and 16, respectively, in any suitable manner as by soldering or welding. Members 37 extend below the lowest points of bottom members 24, 33, and 34 and are there then bent inwardly to form feet as indicated at 38. They then extend upwardly and inwardly to have their ends secured to an inner circular frame member 39 located directly below in spaced relationship to member 22. Member 39 is located horizontally at the level of the lowest points of compartment bottom members 24, 33, and 34, the inner member 29 of each compartment C being secured thereto.

In order to prevent water in the washer casing from circulating freely baffles 41 are provided which extend between the vertical extension of members 37 and ring 39. These baffles extend adjacent the bottom of the casing, as shown in Figure 1, and materially restrict the circulation of water without eliminating it.

Figure 2:
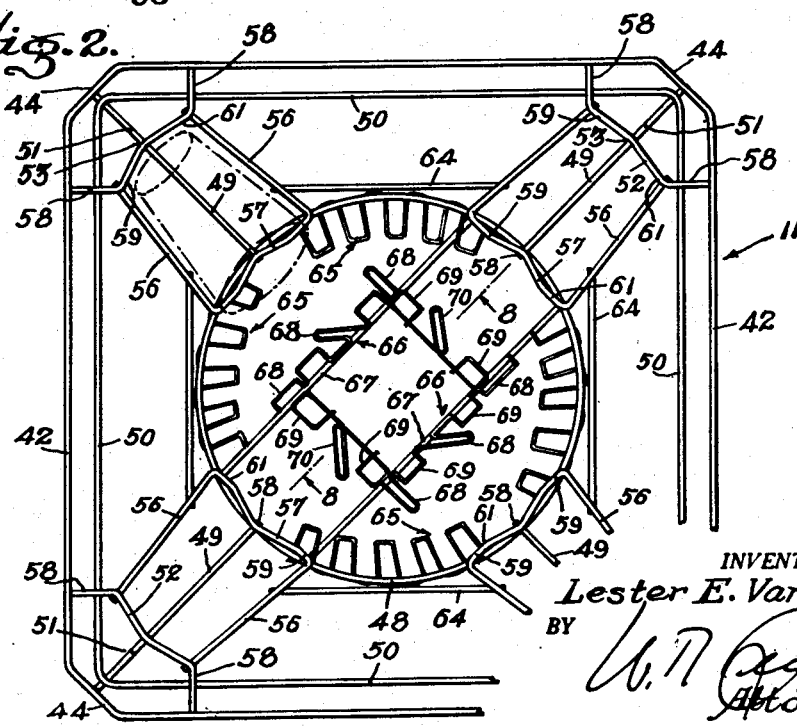
Figure 2 is a plan view of an upper section of the device.

The upper section of the rack fits over the lower and has a main horizontal frame member 42 of the same shape and size as the upper horizontal frame member 17 of the lower section. The corners 43 of member 42, however, are angled off as shown at 44 in Figures 2 and 6 so that they rest on the angled corners 47 of the lower part being kept from moving out of registration therewith by the close fit of both sections within the machine casing 13.

Referring now to Figure 6 in particular, peripheral member 42 is seen to be connected to a central smaller sized ring member 48 by members 49 which first extend upwardly and inwardly from its corners to points 51 where they are bent to extend downwardly and inwardly to the ring. A second peripheral horizontal frame member 50 of slightly smaller size than member 42 is secured part way up the upwardly extending leg of members 49.

An M-shaped member 52 straddles each corner of peripheral member 42, its center point 53 being connected to the top point 51 of adjacent member 49. The angular bends 54 at the upper outer corners of the M are connected to ring member 48 by members 56 each having a central downwardly pointed V-shaped portion 57 the apex 58 of which is fixed, as by soldering or welding, to ring member 48. The top of each V section is bent outwardly, as indicated at 59 and 61, the entire V including portions 59, 61 lying substantially in a vertical plane tangent to ring 48. The corner construction just described is adapted to serve in each instance to support a water glass, the base of the glass resting in the V of the outer M member 52, the sides of the glass resting on the underlying member 49 and between the sides of member 52, the open end of the glass abutting the V 57. To brace the glass-supporting corners interconnecting straight brace members 64 extend between adjacent sides of members 56.

Ring member 48 carries a length of wire bent into a series of adjacent horizontal loops 65 which may be rectangular in form, as shown in Figure 6, and are sufficiently large to receive and pass the downwardly extended handles of spoons of all sizes but not the bowls which therefore remain suspended. Ring member 48 and loops 65 are preferably arranged in the horizontal plane of peripheral member 42.

An inner supporting member 66, shown as of rectangular form though not necessarily so, is supported centrally of ring 48 by a pair of spaced wires 67 the end portions of which slope downwardly and inwardly from the ring 48 as shown in Figures 6 and 8. Member 66 is designed to support knives and forks in vertical positions being provided with a plurality of horizontally extending loops or pockets 68, 69, and 70. The latter are formed along the wires 67 by bending a wire length into the desired forms relative to wires 67 and soldering them in place at points of adjacency. Between the spaced wires 67 the loops are formed by doubling the wire back upon itself in the desired shapes, the end loops being fixed to the members 67. It will be noted in Figures 6 and 9 that the member 66 includes narrow slots 68, some of which are set at an angle, adapted to receive the blades of knives and rectangular loops 69 somewhat smaller than loops 65 secured to ring 48. Narrow loops 70 between the terminal rectangular loops 69 are formed by crossing over the wires at the inner end of a loop and soldering the wires together at the point of cross-over.

In explaining the use of the rack of my invention it will be assumed that the dishwashing machine forming the subject matter of my earlier patent application is to be utilized. The housewife may load the lower section of the rack before or after placing it in the casing of the machine.

The four dish-receiving spaces or compartments along each side of the rack, indicated as A, B, C, and D in Figure 3, form four identical series or groups of partitions. If, for example, the dishes from a meal for four persons are to be washed, the meat plates can all be placed in compartments A, the soup dishes in compartments B, dessert bowls in compartments C, and coffee cups in compartments D.

The upper section of the rack may then be put in position over the lower section within the casing, the angled corner portions of the upper section overlying the top corners of the lower section. Water glasses will be placed on the corner glass supports in the manner illustrated in Figure 1. Spoons are positioned, bowls inward, with their handles thrust vertically downwardly through the loops secured to the central ring member, the bowls of the spoons resting upon the top of the loops, as shown in dotted lines in Figure 1. Forks are positioned in the smaller loops of the supporting member 66, and knives are positioned with their blades passed through the narrow loops 68 or 70 with their handles resting against the upper surfaces thereof.

Odd shaped additional pieces or serving dishes, soup tureens, gravy boats, wine glasses and the like may be washed by hand since the average housewife treats such articles with particular care and their shapes are so varied that they cannot be provided for conveniently in a compartmented dishrack.

It has been found that the dishrack described herein will support tableware for efficient cleaning. The compartments are arranged so that radially thrown water impinges against and flows over all surfaces from the center of the rack outwardly.

While the particular construction herein shown and described in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A rack for dishwashing machines constructed from lengths of narrow metal arranged to form an open framework, comprising: a section having an upper horizontal peripheral member with sides extended at right angles to one another, a lower horizontal peripheral member, a central frame member arranged within said lower peripheral member, a narrow metal strip extending parallel to each side of said lower peripheral member, vertical members spacing said upper peripheral member from said lower peripheral member, a plurality of strips extending angularly between said strips parallel to the lower peripheral member and the central frame member and defining a plurality of compartments adapted to receive dishes and plates of different sizes, the dishes and plates of largest size being positioned between the lower peripheral member and the strips extending parallel thereto with their faces turned inwardly, dishes and plates and cups being positioned in the other compartments with their faces at an angle to the largest dishes and plates, and U-shaped members extending below the level of the lower peripheral member and having their arms secured to contiguous members defining said compartments to form supports for the lower edges of the dishes and plates in said compartments.

2. A rack for dishwashing machines as set forth in claim 1 characterized in that said section includes an inner frame member positioned below the central frame member and in that vertical members at the corners of the upper and lower peripheral members extend below the U-shaped members and are then bent sharply inwardly and sloped upwardly and connected to said inner frame member to provide supporting feet spacing said section above the bottom of a washing machine.

3. A rack for dishwashing machines as set forth in claim 2 characterized in that baffle plates are secured to the supporting foot portions of said vertical members to prevent circulation of cleansing water below said rack.

4. A rack for dishwashing machines constructed from narrow lengths of metal arranged to form an open framework, comprising: a section of rectangular form having an upper horizontal peripheral member and a lower horizontal peripheral member, a central frame member arranged within said lower peripheral member, vertical members arranged at the corners of and spacing said upper and lower peripheral members, said vertical members being extended below said lower peripheral member to support the rack above a washer bottom, a plurality of strips each extending between a corner of said lower peripheral member and said central member, a plurality of intermediate members each extending parallel to a side of and in the plane of said lower peripheral members being secured at one end to the peripheral member and at the other end to one of said strips extending between a corner of the lower peripheral member and the central frame, a plurality of compartment-defining members extending between said intermediate members and the central frame and at an angle to an adjacent side of said lower peripheral member, certain of said members being angled intermediate their length to support the backs of plates and dishes therebetween, and U-shaped members extending between said compartment-defining members having one arm connected to one member and the other arm secured to the next adjacent member and effective to support the lower edges of the dishes positioned between said compartment-defining members, said compartment-defining members being arranged to form identical series of compartments for dishes along and within each side of the rectangular lower rack section.

5. A rack as set forth in claim 4 and in which said U-shaped members have one arm of the U shorter than the other arm, the linger arms being secured to the compartment-defining members nearest the central frame member, the bottom of the U-shaped members being inclined to support the back edge of a supported dish.

LESTER E. VAN HISE.

References Cited in the file of this patent

UNITED STATES PATENTS

| Number | Name | Date |
|---|---|---|
| 715,287 | Paine | Dec. 9, 1902 |
| 1,968,657 | Stoddard | July 31, 1934 |
| 2,035,625 | Walker | Mar. 31, 1936 |
| 2,469,966 | Idle | May 10, 1949 |